United States Patent [19]

Paulus et al.

[11] 4,148,961

[45] Apr. 10, 1979

[54] WINDLACE CARRIER

[75] Inventors: Peter V. Paulus, Ypsilanti; Norman C. Jackson, Livonia, both of Mich.

[73] Assignee: The Standard Products Company, Dearborn, Mich.

[21] Appl. No.: 860,729

[22] Filed: Dec. 15, 1977

Related U.S. Application Data

[63] Continuation of Ser. No. 707,200, Jul. 21, 1976, abandoned.

[51] Int. Cl.² .............................................. E06B 7/16
[52] U.S. Cl. ..................................... 428/358; 49/491; 49/500; 52/716
[58] Field of Search ...................... 49/491, 490, 500; 52/716; 428/358

[56] References Cited

U.S. PATENT DOCUMENTS

| | | | |
|---|---|---|---|
| 2,699,582 | 1/1955 | Schlegel | 49/491 |
| 3,124,851 | 3/1964 | Straight et al. | 49/491 |
| 3,198,689 | 8/1965 | Lansing | 49/500 |
| 3,430,387 | 3/1969 | Clapham | 49/491 |

Primary Examiner—C. W. Lanham
Assistant Examiner—V. K. Rising
Attorney, Agent, or Firm—Harness, Dickey & Pierce

[57] ABSTRACT

The carrier for a windlace, garnish molding and the like is made from a wire which is bent back and forth to form a continuous strip having straight lateral portions joined by reentrantly bent portions thereby to form alternately directed loops. The laterally extending portions are joined by a flexible plastic material which forms longitudinally extending ribs above and below the laterally extending wire portions. The carrier is covered by a rubber or plastic material and is formed to any desired cross-section.

1 Claim, 5 Drawing Figures

WINDLACE CARRIER

This is a continuation of application Ser. No. 707,200, filed July 21, 1976, now abandoned.

BACKGROUND OF THE INVENTION

The following patents were uncovered which disclose different types of molding strips having different carriers within the covering material.

U.S. Pat. Nos. 2,536,397, 2,574,124, 2,699,582, 3,167,825, 3,167,856, 3,198,689, 3,222,769.

SUMMARY OF THE INVENTION

Various types of windlace carriers have heretofore been provided to provide reinforcement for vehicle windlace. The reinforcing element or carrier of the present invention comprises a wire of small diameter which is bent back and forth in a common plane to provide laterally extending portions, which may be an inch or more in length, with alternate reverse bends at the side edges of the carrier which permits it to be continuously formed. A plastic material is applied to the laterally extending portions which may be done by advancing the carrier on a table having a slot therein and a nozzle for delivering a bead of heated plastic material as the formed strip is advanced beneath a roll having a matching slot therein. As the plasticized material is advanced beneath the roll, ribs are formed above and below the laterally extending wire portions. Upon cooling, the plastic material secures the laterally extending portions in fixed relation to each other at the center of the carrier. The carrier so formed is flexible as it may be bent along its length and be formed into a U-shaped cross-section while maintaining its flexibility. A flexible plastic or rubber material may be extruded over the strip, when flat or when formed into U-shape, to provide the completed windlace or trim.

DESCRIPTION OF THE PREFERRED EMBODIMENTS

Figure 1:
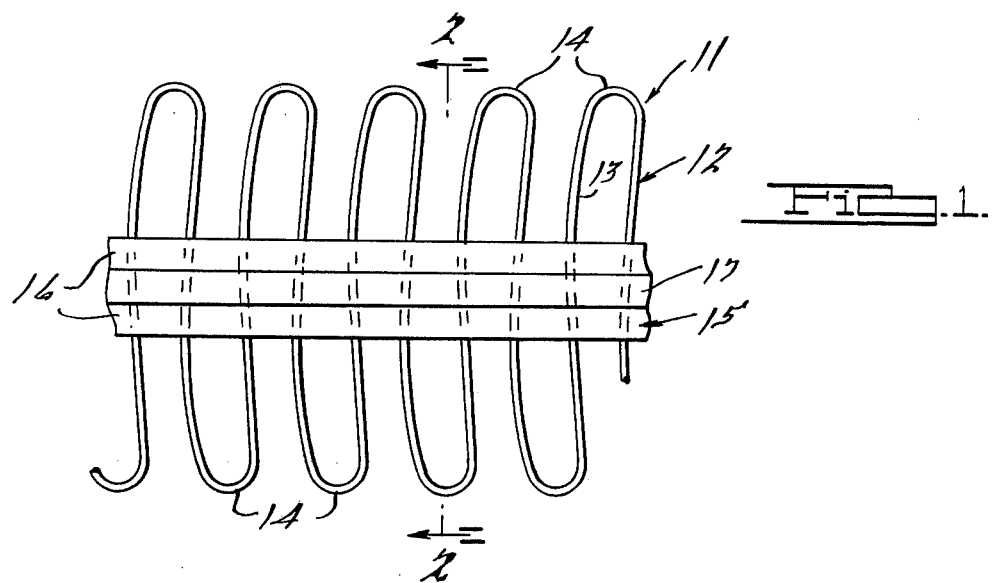
FIG. 1 is a plan view of a carrier formed from a single length of wire, the convolutions of which are secured together in a manner embodying features of the present invention.
Figure 2:
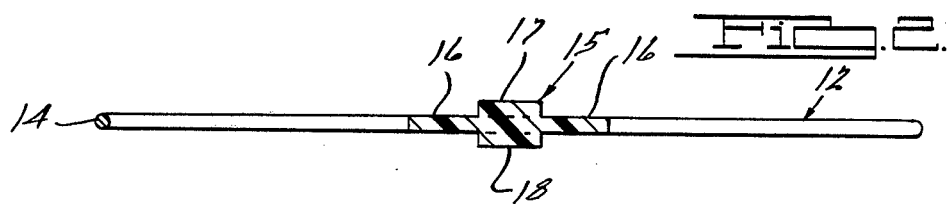
FIG. 2 is an enlarged sectional view of the structure illustrated in FIG. 1, taken on the line 2—2 thereof.

In FIG. 1, a carrier element 11 comprises a wire 12 which is bent back and forth to provide laterally extending straight portions 13 which are joined at the side edges of the element 11 by alternately reentrantly bent portions 14. The carrier 11 is continuously formed and, as illustrated in FIG. 2, has a plastic stabilizing element 15 extending across and joining the center portions of the laterally extending portions thereof. It will be noted that some of the plastic material 15 has been deposited between the portions 13 at 16 and that a top rib 17 and a bottom rib 18 are provided thereon. The portions 16 space the straight portions 13 from each other and maintain them in generally parallel relation. The portions 13 are retained in fixed relation to each other by the ribs 17 and 18. The plastic material 15 is preferably a flexible polymer, for example, polycarbonate.

Figure 4:
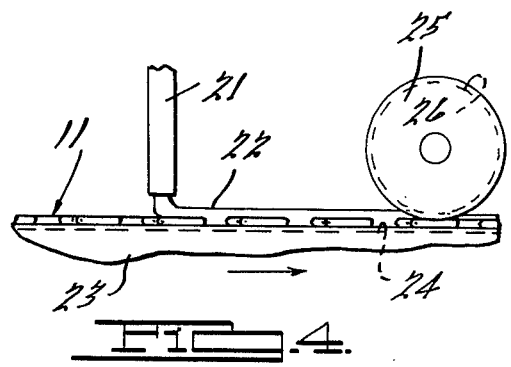
FIG. 4 is a broken view of one structure which applies a plastic material to the center of the laterally extending portions of the carrier illustrated in FIG. 1.

The polycarbonate material may be applied in the manner illustrated in FIG. 4 wherein a nozzle 21 delivers a bead 22 of the material onto the top of the formed wire strip 12 as it is advanced on a table 23. The table has a recess 24 therein aligned with the advancing bead 22 of plastic material, the strip 12 moving under a roll 25 which has a recess 26 therein aligned with the recess 24 in the table. The strip 12 carries the bead 22 of plastic material therewith at a rate which delivers a predetermined amount of the material under the roll 25 which presses the material between the laterally extending portions 13 of the strip 12 to form the spacing portions 16 and the ribs 17 and 18. Heat may be applied to the table, to the plastic material, to the wire 12 and/or to the roll 25. Enough heat is provided to work and shape the plastic material in a manner to join the portions 13 of the wire 12 in fixed semi-rigid relation, yet provide flexibility to the carrier 11.

Figure 5:
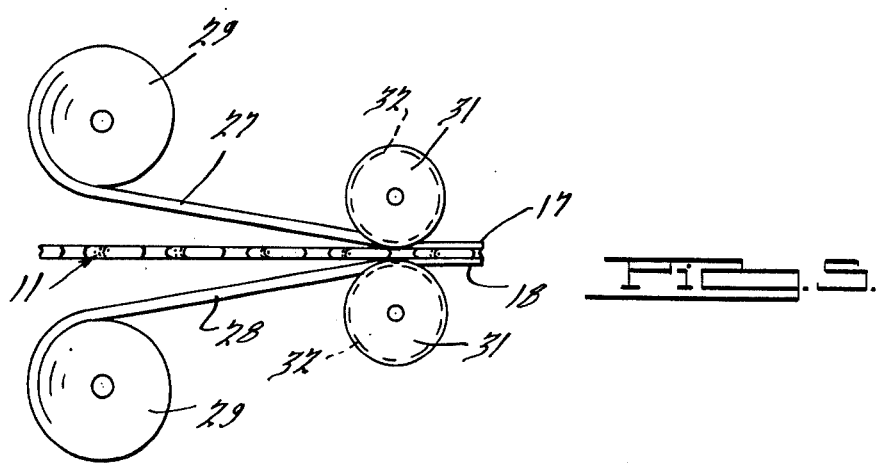
FIG. 5 is a view of structure, similar to that of FIG. 4, showing another method of applying the plastic material to the center of the laterally extending portions of the carrier illustrated in FIG. 1.

In FIG. 5 an apparatus is illustrated which produces the same results as the apparatus of FIG. 4. Like plastic strips 27 and 28 are advanced from rolls 29 to the center of the top and bottom faces of the wire 12 which is disposed therebetween and advanced therewith between a pair of rolls 31. The rolls 31 have aligned recesses 32 therein which force the material of the plastic strips 27 and 28 between the laterally extending portions 13 of the wire 12 to form the spacing portions 16 and the rib portions 17 and 18. In this manner, the strip 11 whether made by the process of FIGS. 4 or 5 is the same as that illustrated in FIGS. 1 and 2.

Figure 3:
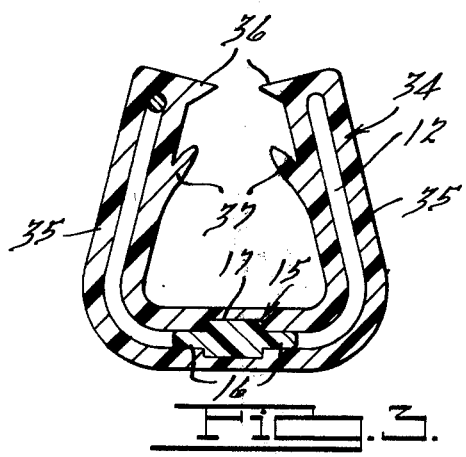
FIG. 3 is a sectional view of a flexible molding with the carrier of the present invention imbedded therein.

Various types of trim or windlace elements may be reinforced by the carrier 11, a U-shaped garnish molding 34 being illustrated in FIG. 3. In this arrangement, the carrier 11 may be formed into a U-shaped cross-section before or after it is covered by a decorative plastic coating 34 which is extruded thereover. The side portions 35 of the trim 34 are provided with inwardly extending ribs 36 and 37. The ribs 36 and 37 engage a supporting projection and retain the formed trim strip 34 thereon in fixed relation for the purpose of ornamentation, air control, or the like.

While it will be apparent that the invention herein disclosed is well calculated to achieve the benefits and advantages as hereinabove set forth, it will be appreciated that the invention is susceptible to modification, variation and change without departing from the spirit thereof.

We claim:

1. A carrier for an elongated trim strip of U-shaped cross section comprising a continuous serpentine wire folded transversely back and forth about longitudinal axes to define laterally extending center portions joined by reentrantly folded longitudinally extending end portions, the center portions of said wire being folded about a pair of spaced longitudinally extending axes to define said U-shaped cross section, said axes being spaced inwardly from the end portions of said wire an amount sufficient to make the legs approximately equal to the bight of said U-shaped cross section, and a one piece plastic stabilizing element disposed centrally of and engaging the bight only of the center portion of said wire, said stabilizing element having portions extending between and above and below said wire whereby the center-portions thereof are positively spaced from one another yet are foldable about said longitudinal axes without requiring folding of said stabilizing element.

* * * * *